(No Model.)  5 Sheets—Sheet 1.

L. T. KLINE.
MACHINE FOR MAKING EXCELSIOR.

No. 561,591.  Patented June 9, 1896.

Witnesses
W. T. Norton
R. H. Wood

Inventor
Lewis T. Kline
By
His Attorneys (No Model.) 5 Sheets—Sheet 4.

L. T. KLINE.
MACHINE FOR MAKING EXCELSIOR.

No. 561,591. Patented June 9, 1896.

Witnesses
W. T. Norton
P. H. Wood

Inventor
Lewis T. Kline
By his Attorneys (No Model.) 5 Sheets—Sheet 5.

L. T. KLINE.
MACHINE FOR MAKING EXCELSIOR.

No. 561,591. Patented June 9, 1896.

Witnesses

Inventor
Lewis T. Kline

UNITED STATES PATENT OFFICE.

LEWIS T. KLINE, OF ALPENA, MICHIGAN.

MACHINE FOR MAKING EXCELSIOR.

SPECIFICATION forming part of Letters Patent No. 561,591, dated June 9, 1896.

Application filed August 10, 1894. Serial No. 519,965. (No model.)

*To all whom it may concern:*

Be it known that I, LEWIS T. KLINE, a citizen of the United States, residing at Alpena, in the county of Alpena and State of Michigan, have invented certain new and useful Improvements in Machines for Making Excelsior; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to machines for manufacturing excelsior, and has for its object the production of a machine of this character possessing advantages in point of simplicity and durability, and by which the capacity is largely increased and a better quality of excelsior produced and the product more conveniently and rapidly handled.

The nature of my invention will appear from a reading of the subjoined description, when taken in connection with the accompanying drawings, which form a part of this specification, and in which—

Figure 1:
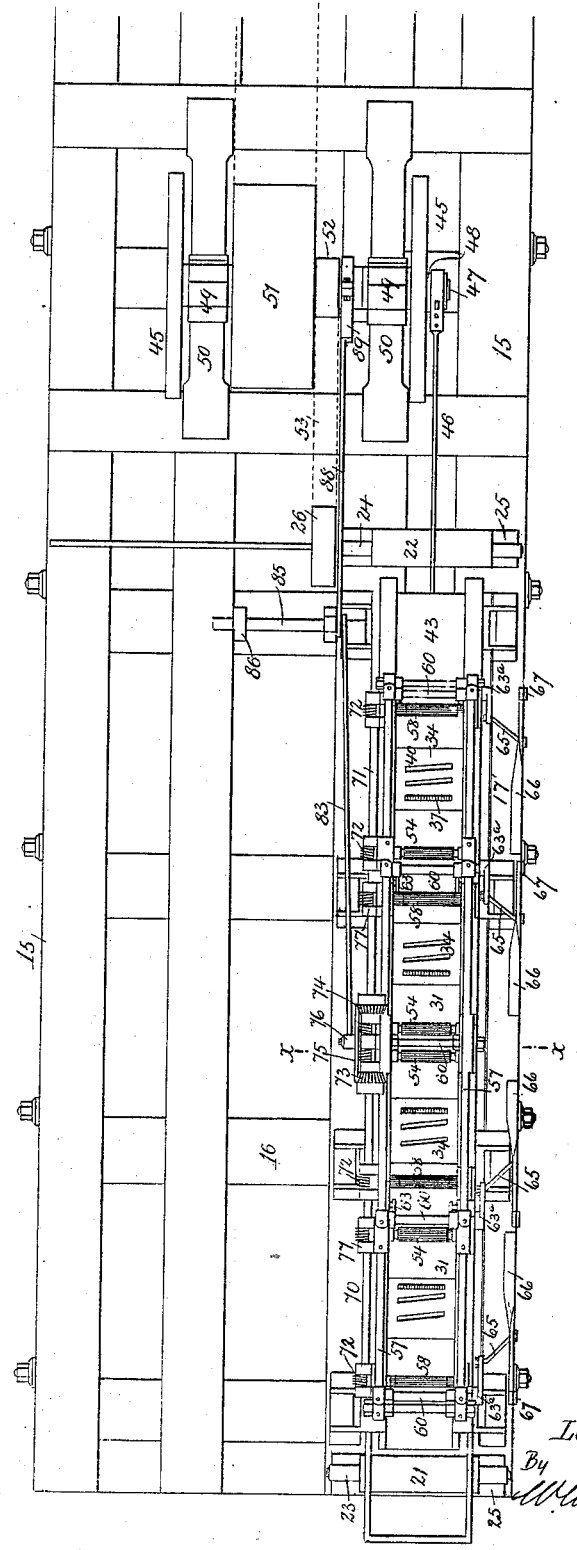
Figure 2:
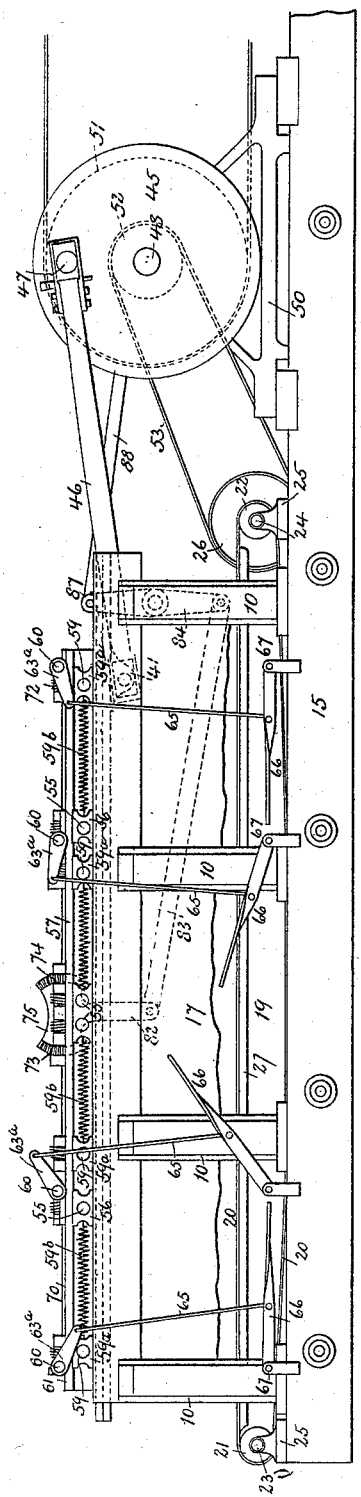
Figure 3:
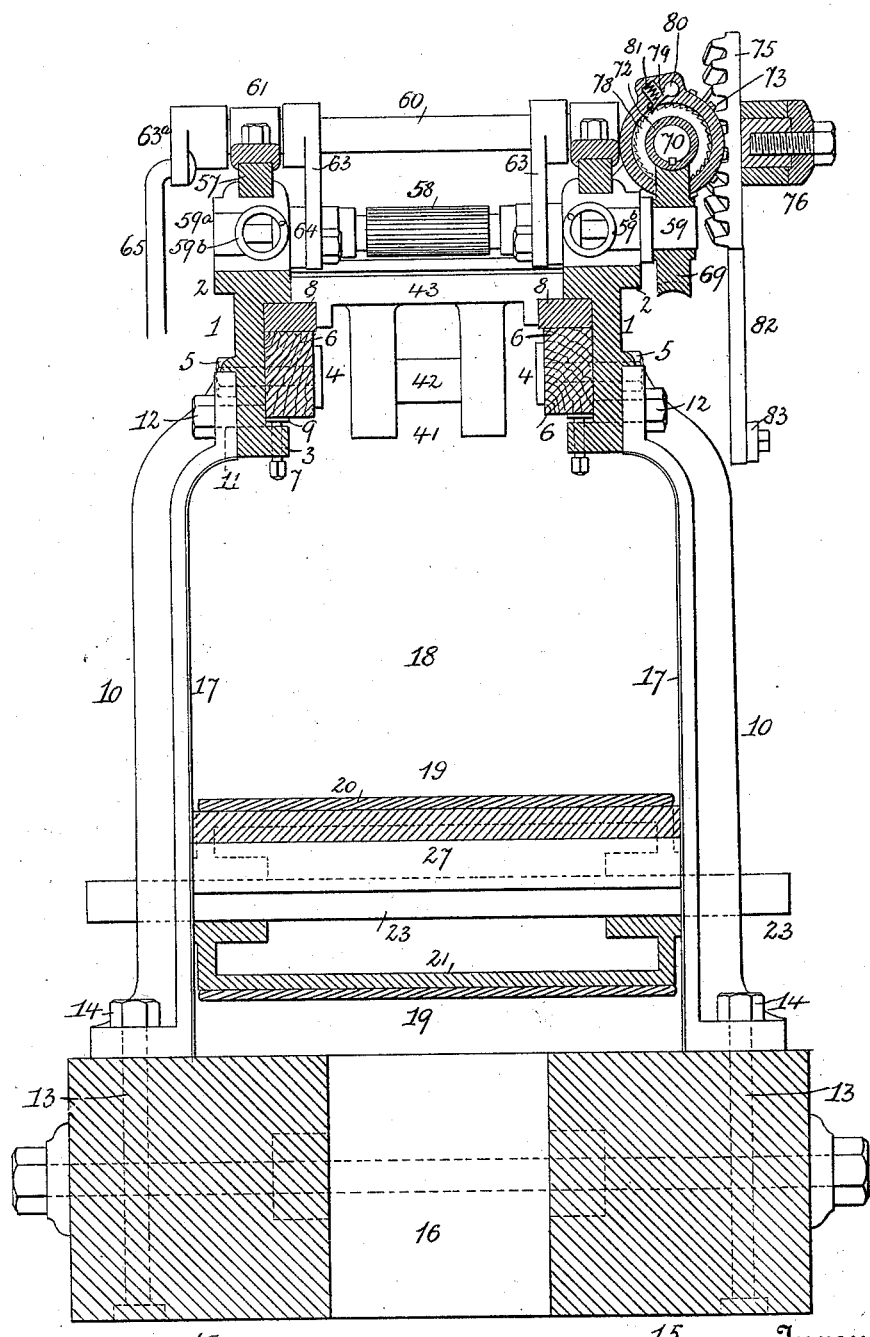
Figure 4:
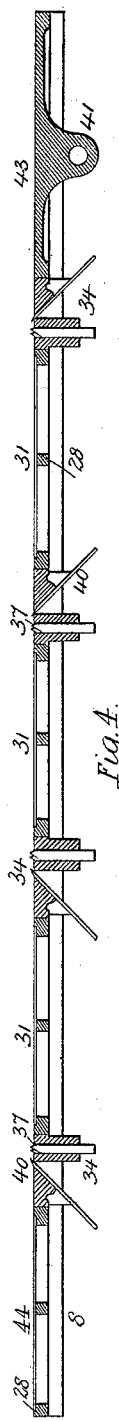
Figure 5:
Figure 9:
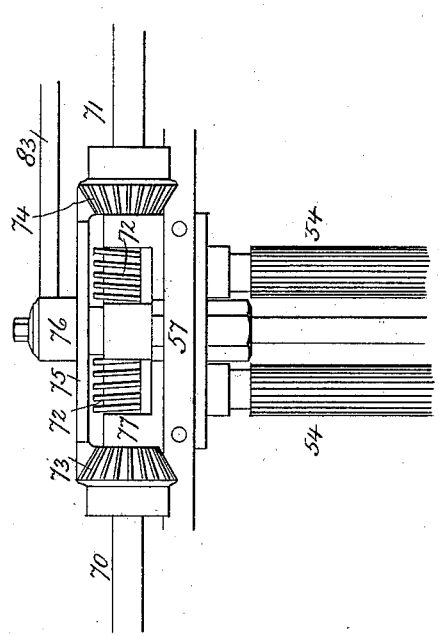
Figure 8:
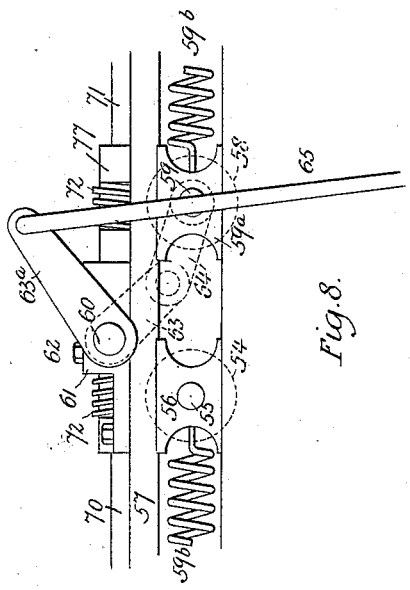
Figure 6:
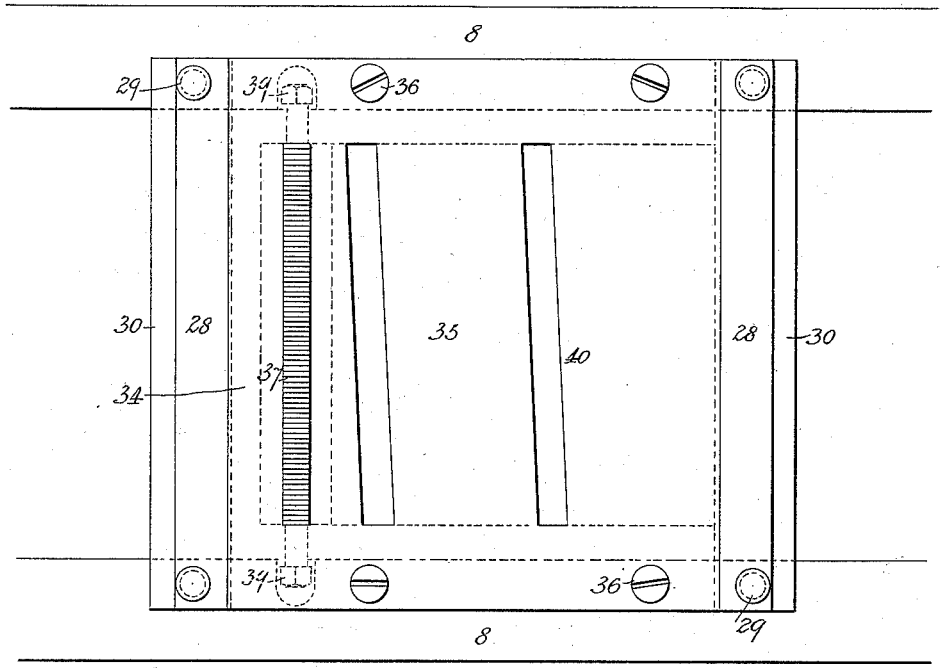
Figure 7:
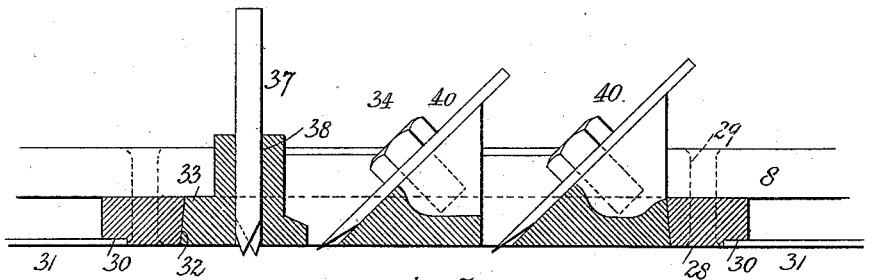

Figure 1 is a top plan view of the machine. Fig. 2 is a side elevation of the same. Fig. 3 is an enlarged transverse sectional view on line *x x* of Fig. 1. Fig. 4 is an enlarged longitudinal sectional view of the cutter-frame for single knives. Fig. 5 is a similar view of the cutter-frame for double knives. Fig. 6 is an enlarged top plan view of one of the cutter-heads, and Fig. 7 is a vertical longitudinal central section of the same. Fig. 8 is a detail sectional view, enlarged, of the devices for controlling the movable feed-rolls; and Fig. 9 is a plan view, partly in section, of the means for driving the rolls.

Like numerals of reference denote like parts throughout the figures of the drawings.

Referring to the drawings by numerals, 1 1 denote the main portions of the side frame of the machine, which consist of the beams flanged at their upper ends at 2 and at their lower ends at 3, and to the inner sides of which are secured, by means of headed bolts 4 and nuts 5, the guides 6 6, which are vertically adjustable by means of screw-bolts 7, and which support the side bars or stiles 8 8 of the cutter-frames presently to be described. The adjusting-screw bolts 7 are passed through the lower flange 3 and abut against the under side of the guides 6 6, suitable metal plates 9 being interposed to distribute the strain on the guides, which, as shown, are preferably of wood.

The beams 1 are supported by legs 10 10, the connection being made by means of bolts 11 and nuts 12, and the legs rest upon and their lower ends are secured by bolts 13 and nuts 14 to wooden sills or floor-timber comprising side pieces 15 and cross-pieces 16, as shown. To the inner sides of the legs 10 are secured linings 17 17, composed, preferably, of sheet-steel and which inclose a chamber or space 18, which is below the cutter-frame and receives the excelsior therefrom.

In the bottom of the chamber is a conveyer 19, on which the excelsior is deposited and by which it is carried out of the chamber. This conveyer consists of a belt 20, which is of sufficient width to nearly fill the chamber transversely, and which is passed around two drums 21 22, mounted on shafts 23 24, journaled in bearings 25, secured to the side pieces 15 at each end of the frame. On the shaft 24 is mounted a pulley 26, by which the drums and belt are operated, said pulley being driven through connections with the driving-shaft presently to be described.

27 is a table which fills the entire horizontal area of the chamber, and is located below the upper turn of the belt and over which the latter travels free from sagging. The conveyer belt or apron has a continuous travel and operates to convey the excelsior as it is deposited thereon to the end of the machine, from whence it is carried and disposed of in any suitable or preferred manner.

The cutter-frames each comprise the side bars or stiles 8 8, before referred to, which are arranged parallel to each other and secured together on their under side by cross-bars 28 28, rivets 29 being preferably employed for the connection, and said cross-bars are partly planed out on their inner side at 30 to accommodate the ends of steel or other metal plates 31, as shown. The cross-bars are preferably slightly beveled on one side at 32 to form shoulders for the ends 33 of the cutter-heads 34, which ends are similarly beveled. Said cutter-heads each consist of a rectangular plate 35, which fits a corresponding opening made therefor in the frame and is secured at each side to the under side of the stiles by screws 36. Each cutter-head carries a set of spurs 37, arranged transversely and secured in a vertical slot 38 by set-screws 39, which bear against the end spurs. I may employ to each head one or two inclined knives 40, according to the work desired; but I prefer to employ the latter number to each head, although both forms are shown. The cutter-heads are removably secured to the frames, and the securing devices are such as permit the rapid removal and insertion of the heads, as it will be evident that the wear on the spurs and knives necessitates an occasional sharpening and adjustment of the latter, and for this reason the heads are made in duplicate, and the ones not in use can be readily fitted up and then inserted in place of the heads carrying the worn spurs and knives without loss of time. In practice the under side of the plates lie flush with the under sides of the cross-bars 28 and plates 31, and form a surface to which the spurs and knives are adjusted. As will be evident, the spurs operate to slit the lumber and the knives following thereafter cut to the depth of the slits made by the spurs. 41 41 denote lugs on one end of each frame which carry a wrist-pin 42, to be presently referred to. These lugs are preferably cast integral with a plate or head 43, which connects the stiles at one end thereof, and a similar plate 44, but without lugs, is employed to connect the other ends of the stiles.

The cutter-frames have a reciprocating movement and are movably supported by the guides 6, the stiles being interposed between said guides and the flanges 2 and held laterally by the inner sides of the beams. The movement of each of the frames is imparted by a crank-disk 45, through a connecting rod or pitman 46, which is secured at one end to the crank-pin 47 and at the other end to the wrist-pin 42, carried by the lugs on the frame. The crank-disks are keyed on the main shaft 48, which is journaled in boxes 49 on brackets 50, secured to the floor-timbers, and this shaft also carries a driving-pulley 51, which has belt connection with a suitable source of power not here shown. On the main or driving shaft is also a pulley 52, and 53 is a belt which is passed around said pulley and around the pulley 26, which drives the conveyer belt or apron.

The blocks of timber from which the excelsior is to be cut are held endwise of the grain between feed-rollers, the nature of which and the means for actuating the same I will now describe.

54 54 represent feed-rolls, which are provided with spindles or trunnions 55, journaled on each side of the frame in bearings 56, clamped or otherwise secured fixedly between the upper sides of the beams and longitudinally-arranged guide-bars 57. Movable feed-rolls are shown at 58 58 and are similarly provided with spindles 59, journaled in bearings 59ª, which are movable and arranged to slide freely between the beams and the guide-bars 57, and these movable rolls are normally drawn toward the fixed rolls by means of coil-springs 59ᵇ, which are each connected at one end to a fixed bearing or box and at the other end to the adjacent movable box and occupy the space between the guide-bars and the beam.

The blocks of timber from which the excelsior is to be cut are each held between a stationary and a movable roll, and in order to permit of the insertion of a block I provide means for drawing the movable rolls from the fixed rolls against the action of the connecting-springs as follows: 60 60 are rock-shafts journaled in bearings or boxes 61, secured by means of bolts 62 on the guide-bars, and to which are fixedly secured rock-arms 63, which are connected to the spindles of the movable rolls by links 64. On one end of each of the rock-shafts is a crank 63ª, which is connected by a rod 65 to a foot-lever 66, pivoted at 67 to the frame, these devices serving to partially rotate the shaft and to move through the rock-arm and link the movable roll sufficiently to admit a fresh block of timber; or, if desired or preferred, instead of the foot-operated devices just referred to a lever may be secured to the end of each rock-shaft and actuated by hand. The operation, however, of either of the means stated is identical, in that the object is to separate the rolls.

Each knife-frame, as shown, is provided with two sets of cutter-heads, the knives of each set being inclined toward the center of the machine, so that the cutting is always toward such center regardless of the direction of the movement of the frames. The cutter-heads are located at regular intervals and each set cut alternately—that is, in the forward movement, for instance, of the frame, one set of heads having knives inclined in the forward direction operate to cut the block for such heads, while at the same time the other set of heads with its knives oppositely inclined are idle, and in the rearward movement of the frame the rearwardly-inclined knives are active while the forwardly-inclined knives are idle. Thus it will be seen that the cutting operation is constant, and while the machine is in motion the product is continuous.

The machine is, as shown, provided with two frames, one at each side, and both frames are reciprocated simultaneously, but preferably in opposite directions, through the pitmen and the crank-disks on the driving or main shaft previously described. In consequence of this arrangement the active knives of one frame operate in a direction opposite to the direction of the active knives of the other frame, and hence a large quantity of the product is the result and the movement of one frame counterbalances the movement of the other frame.

With my machine a block of timber is given to each set of knives, and by "set" is meant all of the heads of one frame which have similarly-inclined knives. The blocks are prevented from working under the feed-rolls by means of strips 68, located below said rolls.

Referring now to the means for operating the rolls to feed the blocks to the knives, it will be evident that as each set of knives require a separate block a separate feed for each block is essential, and in order to accomplish this result I employ actuating devices as follows, a description of the devices for the rolls for one frame being sufficient: On one end of the spindles of the feed-rolls are worm gear-wheels 69, and 70 71 denote a shaft divided centrally and carrying worms 72, which mesh with the worm gear-wheels 69. The two lengths of the shaft 70 71 are in line and the inner ends are but slightly separated at a point central of the machine, and adjacent to these inner ends are bevel-gears 73 74, which are loose on the shafts and mesh with a segment-gear 75, which is pivoted at 76 and operated in a manner presently to be described. The two lengths of the shafts 70 71 are journaled in bracket-bearings 77 77, arranged at each side of the fixed and movable feed-roll bearings, and are key-seated for their entire length for rigid connection with the worms 72. Said worms 72 are alternately rights and lefts and operate, through the worm gear-wheels, both the fixed and movable feed-rolls to cause the latter to feed the blocks to the active cutter-heads. The two lengths of shafts are actuated alternately to operate the feed-rolls through the segment and bevel-gears and through clutch mechanisms consisting of ratchet-wheels 78, fixed on the shafts, and pawls 79, pivoted on the bevel-gears at 80 and held in engagement with the teeth of the ratchet-wheels by springs 81. The movement of the segment, as will be evident, operates but one of the shafts at a time, the other shaft being idle, it being understood that during said operation of the shaft and the simultaneous operation of the feed-rolls on one side of the center the knives in that portion of the frame are active, whereas on the other side, the knives being inactive or idle, the other shafts and rolls are prevented from rotating by the disengagement of the pawl and the teeth of the ratchet-wheel on the clutch mechanism between the bevel-gear and the said idle shaft. The inactive knives are thus permitted their length of movement unobstructed by the blocks of timber, inasmuch as the feeding of the latter ceases while the cutting is going on at the other side of the center.

As shown and as previously stated, each block is fed by a right and a left worm meshing with the worm gear-wheels on the spindles of the feed-rolls, one of the latter being fixed and the other movable, and as these feed-rolls are rotated in opposite directions the blocks are caused to move thereby against the cutter-frame.

The segment-gear is operated through connections with the driving-shaft as follows: 82 is an arm depending from said segment and connected by means of a rod 83 with the lower end of a rock-lever 84, mounted on a short shaft 85, journaled in bearings 86 86, secured to the frame. This rock-lever is centrally mounted on said rock-shaft, and its other or upper arm 87 is connected by an eccentric-rod 88 to an eccentric 89 on the driving-shaft. By the rotation of said driving-shaft the segment is rocked a degree sufficient to feed the blocks the required distance, which feed determines the depth of the cut of the knives.

From the foregoing the operation will be evident to any one skilled in the art. The blocks are inserted by separating the fixed and movable rolls slightly, and the spring connections between the rolls causes the latter to clamp the block, additional friction being obtained by corrugating or fluting the rolls. When the blocks are inserted, the machine is set in motion and the cutting is done simultaneously on both sides of the machine, but from opposite ends during one direction of the travel of the cutter-frames, and on the return movement of the frames the cutting is vice versa. The blocks are fed intermittently downward the requisite distance just previous to the travel of the active knives and are held in suspension during the travel of the idle knives. The excelsior as it is cut falls from the cutter-frames into the conveyer-belt and is carried by the latter out of the chamber, thus preventing the clogging of any of the parts.

While I have shown and described various details of form and construction in connection with the machine, I do not wish it understood that I confine myself thereto, inasmuch as many of the parts may be modified without departing from the spirit of the invention, as covered by the concluding claims.

By my invention I am enabled to produce a machine of comparatively simple and durable construction and which is very efficient in operation. The capacity, moreover, is largely increased and the product improved, and the facilities for the rapid handling of the excelsior add greatly to the advantages of the machine.

Having now fully and clearly described and ascertained the nature of my invention and in what manner the same is to be performed, what I claim as my invention is—

1. In an excelsior-machine, the combination of the parallel guide-frames, each having inclosing sides, endless carriers arranged in the lower portion of the chamber formed by said inclosing sides, cutter-frames arranged to move in said guide-frames relatively alternately, cutter-heads removably secured to said cutter-frames, each of said heads carrying spurs and planer-knives cutting toward the center of the frame, fixed and movable feed-rolls arranged in separate pairs at both sides of the center of the guide-frame and each carrying a worm gear-wheel, separate feed-shafts on one side of the frames carrying worms which mesh with said worm gear-wheels, and a ratchet device connected with the adjacent ends of the separate feed-shafts for alternately rotating the latter.

2. In an excelsior-cutting machine, the combination of the guide-frames having inner grooved guides, and guide-bars above the same, oppositely-reciprocating flat cutter-frames moving in said guides and carrying removable cutter-heads having knives cutting toward the centers of the frames, fixed, and self-adjusting movable bearings alternately arranged between the guide-frames and bars, feed-rolls having their ends journaled in said bearings and each carrying at one end a worm gear-wheel, springs connected at one end to the movable bearings separate feed-shafts arranged in line at one side of the frames, worms on the shafts meshing with the worm gear-wheels, and means for imparting alternately to each shaft an intermittent motion.

3. In an excelsior-machine, the parallel guide-frames having the guide-bars above the same, oppositely-reciprocating cutter-frames moving in said guide-frames, fixed and movable bearings arranged alternately between the guide frames and bars on each side of the center of the guide-frames, feed-rolls having their ends mounted in said bearings, springs connected to the movable rolls for drawing same toward the fixed rolls, rock-shafts journaled in bearings on the frames and having rock-arms thereon, pivotal links connecting said arms with the bearings of the movable rolls to draw same away from the fixed rolls against the action of the springs, and worm-gearing for actuating intermittently said feed-rolls.

4. In an excelsior-machine, the combination of the parallel guide-frames, the cutter-frames reciprocally movable in said guide-frames, and carrying cutter-heads provided with cutting-knife, a fixed and a movable feed-roll for each cutter-head carrying at one end a worm gear-wheel, separate feed-shafts arranged in line and having their inner ends terminating at the center of the cutter-frames, worms on said shafts meshing with the worm gear-wheels, ratchet-wheels mounted on said shafts near their inner ends, pawls intermittently engaging said ratchet-wheels, and means for actuating said pawls.

In testimony whereof I affix my signature in presence of two witnesses.

LEWIS T. KLINE.

Witnesses:
I. S. CANFIELD,
E. W. LEAVITT.